United States Patent [19]

Klingenbeck-Regn et al.

[11] Patent Number: 5,285,072
[45] Date of Patent: Feb. 8, 1994

[54] PROCESS FOR THE LOCALIZATION OF MULTIPLE SCINTILLATION EVENTS IN A GAMMA CAMERA

[75] Inventors: Klaus Klingenbeck-Regn, Nuremberg; Bernhard Conrad, Erlangen, both of Fed. Rep. of Germany

[73] Assignee: Siemens Aktiengesellschaft, Munich, Fed. Rep. of Germany

[21] Appl. No.: 934,934

[22] Filed: Aug. 25, 1992

[30] Foreign Application Priority Data

Aug. 28, 1991 [EP] European Pat. Off. ......... 91114473.1
Jul. 27, 1992 [DE] Fed. Rep. of Germany ....... 4224794

[51] Int. Cl.$^5$ .................................. G01T 1/164
[52] U.S. Cl. .............................. 250/369; 250/363.02; 364/413.24
[58] Field of Search ............. 250/369, 363.02, 363.01; 364/413.24

[56] References Cited

U.S. PATENT DOCUMENTS 4,672,542 6/1987 Roux et al. .
4,882,680 11/1989 Bonnefoy-Claudet et al. .

FOREIGN PATENT DOCUMENTS 0155463 9/1985 European Pat. Off. .
0387800 9/1990 European Pat. Off. .

OTHER PUBLICATIONS

"A Full-Field Modular Gamma Camera", Milster et al., J. Nucl. Med., vol. 31, No. 4, Apr. 1990, pp. 632-639.

*Primary Examiner*—Paul M. Dzierzynski
*Assistant Examiner*—Richard Hanig
*Attorney, Agent, or Firm*—Hill, Steadman & Simpson

[57] ABSTRACT

In a method for the localization of scintillation events in a gamma camera with a number of photomultipliers the output signals of the photomultipliers, in dependence on a release signal, are subjected to a pattern recognition process. In the pattern recognition process the output signals are compared with comparative signal sets which each comprise the expected values of output signals from photomultipliers which would be generated by several comparative scintillation events with at respective origins at known locations. The locations of the multiple scintillation events are then registered as the origins that belong to a comparative signal set which presents the greatest similarity value to the output signals in question.

14 Claims, 9 Drawing Sheets

PROCESS FOR THE LOCALIZATION OF MULTIPLE SCINTILLATION EVENTS IN A GAMMA CAMERA

BACKGROUND OF THE INVENTION

1. Field of the Invention

The invention relates to a process for the localization of multiple-scintillation events in a gamma camera having a number of photomultipliers whose output signals, in dependence on a release signal, are subjected to a pattern recognition process.

2. Description of the Prior Art

One of the limiting factors for the performance capacity of a gamma or Anger camera is the achievable counting rate. The limit with current systems lies typically at approximately 200,000 events per second. The main reason for this is that the gamma cameras in their present state still only analyze single event within 1 to 2 $\mu s$, and identify it as usable for the nuclear medical image. The selection of valid events occurs, for example, over an energy window, i.e., over the impulse height at the output of a detector.

If two or more gamma quanta arrive simultaneously or virtually simultaneously in the detector, their total energy can exceed the window for single events. The quanta, however, are rejected in conventional cameras, so that the counting rate is clearly reduced. If the time spacing between the two individual events is sufficiently large, special switching circuits there can be used to ascertain a so-called pile-up or a double event. At best, then, the first event can be approximately analyzed and used. The second is rejected, so that again there is a considerable loss in the counting rate. If the time spacing of a double event is too small, both events must be rejected.

In European Application 0,155,463 an analog circuit arrangement is disclosed for the analysis of multiple events. For this purpose a network is provided for communication between the photomultipliers of the gamma camera, with which multiple events can be detected and separated, but only if their spacing is so large that spatially separate signal groups can be formed. Even with a large spacing of the double events the signal groups can mutually interfere, so that the analysis and localization of the two constituent single events are falsified.

A process of the type initially mentioned at the outset is described in the article by Milster et al. "A Full Field Modular Gamma Camera", published in The Journal of Nuclear Medicine, vol. 31, No. 4, April 1990, pages 632 to 639. A modular gamma camera is described therein which delivers useful image information data over the entire crystal surface. The localization occurs after digitalization of the output signals of the photomultipliers with the aid of the maximum-likelihood function. Each module is optically and electronically independent, so that several modules can be combined into a camera system with increased counting rate. This articles does not mention, however, for the increase of a counting rate, also localizing multiple events.

SUMMARY OF THE INVENTION

It is an object of the present invention to construct a gamma camera in such a way that multiple events of arbitrarily different energy, i.e. those that consist of single events of the correct primary energy as well as single events occurring together of the correct primary energy and scatter events, can be separated using the output signals of the photomultipliers of the camera, i.e., can be resolved into the individual single events.

The above object is achieved in accordance with the principles of the present invention in a pattern recognition process wherein the photomultiplier output signals, in dependent on a release signal, are compared with multiple comparative signal sets, which each comprise the expected values of the output signals of the photomultipliers which would be generated by several comparative scintillation events with respective origins at known-positions. The locations of the multiple scintillation events in question are then registered as coinciding with the known origins belonging to the multiple comparative signal set which generates the greatest similarity value with the output signals in question.

With this process multiple events which occur simultaneously as well as substantially simultaneously can be detected and localized. Although the time spacing of the single events forming the multiple event is substantially less than the time needed for the identification of a single event, these single events can still be localized. The counting rate of the gamma camera is therewith increased. Accordingly, for example, the measuring time required for image production can be shortened and with this process useful image signals can also be recovered of examination areas that present increased activity. Furthermore, in addition to the localization, the energy of the individual events can also be determined. This permits the localization and energy determination of simultaneously occurring primary and scatter events. This process is also beneficial in the case of events with different primary energies. Two-isotope studies can be made, for example, or studies of isotopes having respectively different energies.

In a preferred embodiment of the process, the comparative signal sets, each consisting of one comparative scintillation event are stored as a single comparative signal set in a memory and the multiple comparative signal sets are formed therefrom in a calculating unit. This pattern recognition processes requires little storage space.

A further advantageous form of the process forms each multiple comparative signal set as a linear combination of several single comparative signal sets, and the pattern recognition process factors are varied in the linear combination.

In a further variation, the release signal is given if the energy of the sum of all the output signals lies in an energy window, the boundaries of which surround the expected value of the energy of several scintillation events. The events forming the sum may be limited to primary scintillation events in order to save computing time.

In a further variation of the process, the output signals are integrated before they are subjected to the pattern recognition process. The integral of the output signals exhibits less scatter than the heights of the signal impulses. Therewith in the pattern recognition process, the influence of the statistical fluctuations of the signal level is thereby mitigated.

In a further variant of the invention, the time over which the output signals are integrated is changed in dependence on whether the scintillation events occur simultaneously or shortly after one another in time. By shortening the integration time for simultaneously arising scintillation events, the processing time is shortened and the counting rate is thereby further increased.

The multiple comparative signal sets of several comparative scintillation events are preferably stored in a memory. The multiple comparative signal sets needed for the pattern recognition process can be sampled from the memory for comparison with the output signals. The processing time in the computer for the localization is thereby shortened.

DESCRIPTION OF THE DRAWINGS

Two embodiments of the invention are explained in the following with eleven figures.

DESCRIPTION OF THE PREFERRED EMBODIMENTS

Figure 1:
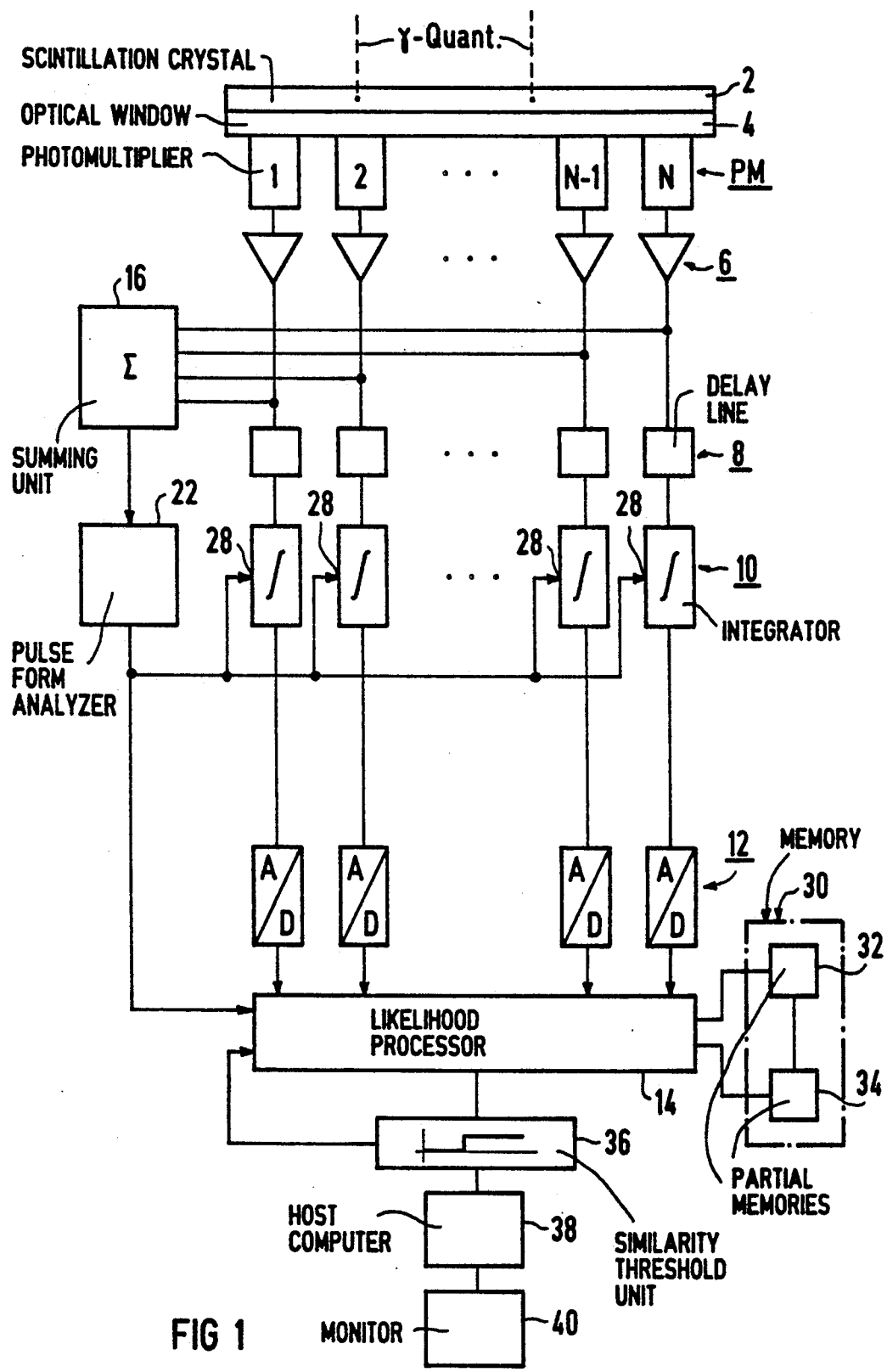
FIG. 1 is a block circuit diagram of a first embodiment of a gamma camera employing a method for the localization of multiple scintillation events, in accordance with the principles of the present invention.

The block circuit diagram according to FIG. 1 shows in an overview the construction of a gamma camera with which multiple scintillation events can be localized by means of a pattern recognition process. In a side view, there is shown schematically a scintillation crystal 2 which consists, for example, of sodium iodide (NaI). The scintillation crystal 2 is optically coupled by means of a window 4, which consists, for example, of Pyrex ® glass, with a number N of photomultipliers PM.

Figure 2:
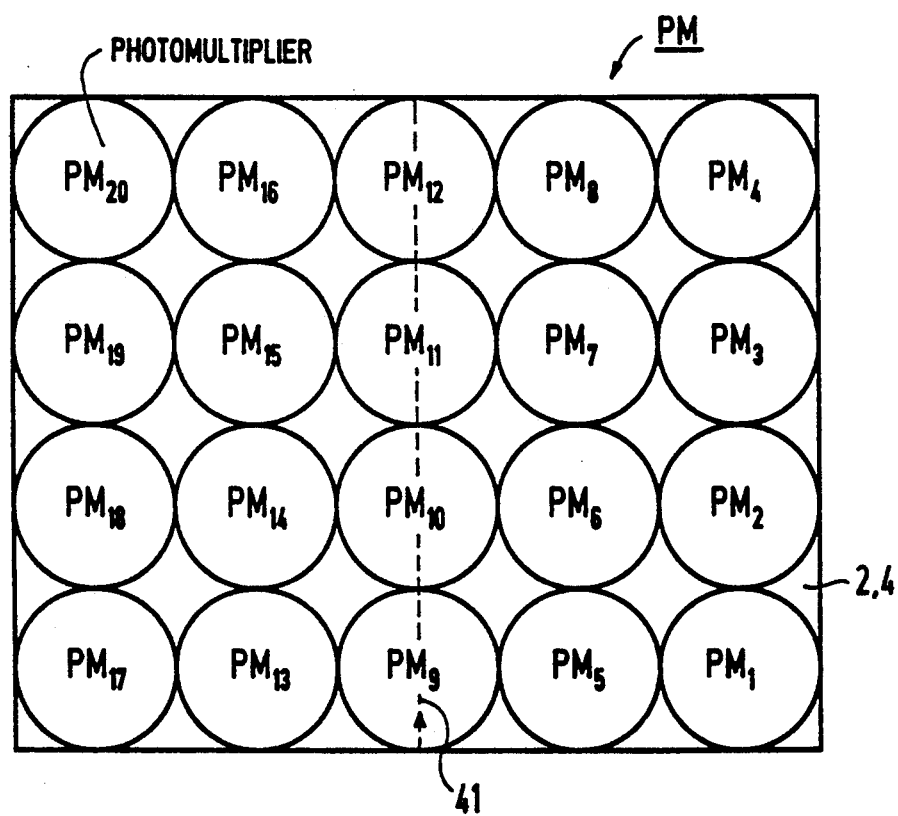
FIG. 2 is a plan view of a scintillation crystal with photomultipliers used in the camera of FIG. 1.

The arrangement of the scintillation crystal 2, the optical window 4 and the photomultipliers PM is shown in a plan view in FIG. 2. Twenty photomultipliers $PM_1$ to $PM_{20}$ with a diameter of 50.8 mm are distributed in a rectangular 4×5 array on the surface of the optical window 4. The scintillation crystal 2 and the optical window 4 have a rectangular area of 254×203 mm². The thickness of the scintillation crystal 2 is 12.7 mm and the thickness of the window 4 is 6.4 mm. The scintillation crystal 2 is sealed.

In FIG. 1 each photomultiplier PM is connected with a signal processing channel. A signal processing channel includes a preamplifier 6, a delay line 8, an integrator 10 and an analog-digital converter 12. The signal processing channels connect the photomultipliers PM with a likelihood processor 14, in which the pattern recognition process proceeds.

Each photomultiplier PM is connected, furthermore, with an input of a summing unit 16. The output of the summing unit 16 is connected to a pulse form analyzer 22.

The pulse form analyzer 22 forms control signals which are fed to the integrators 10 via control inputs 28 and to the likelihood processor 14.

The likelihood processor 14 is connected to a comparative signal unit 30 in which, as described below, multiple-comparative signal sets are formed and/or stored. In the embodiment represented in FIG. 1, the comparative signal unit 30 has a first partial memory 32 which contains comparative signal sets of individual events, and a computing unit 34 which forms multiple-comparative signal sets of multiple events from the comparative signal sets stored in the first partial memory 32.

The output of the likelihood processor 14 is connected via a similarity threshold unit 36 to a host computer 38, which produces a scintillation image from the localized events and displays it on a monitor 40. The host computer 38 takes it into account that only events of the correct primary energy may contribute to the scintillation image.

For the generation of the comparative signal sets deposited in the partial memory 32 the entire crystal surface 2 is scanned with a collimated, radioactive source. In this manner at all scanned locations $x_i$ comparative scintillation events are generated which result in output signals of the photomultipliers PM. The locations $x_i$ are, for example, defined by the coordinates of a rectangular coordinate system. Since these output signals are subject to statistical scattering, expected values of the output signals are stored, i.e., for each location $x_i$ and for each photomultiplier there is formed an average means value $\bar{S}_e(x_i)$ with ($e = 1 \ldots N$, $i = 1, \ldots, k$), of many events and this is received into the comparative signal set. By suitable choice of the activity of the source and an energy window for primary individual quanta, it is assured that the expected values correspond exactly to the absorption of individual quanta at the locations $x_i$.

Figure 3:
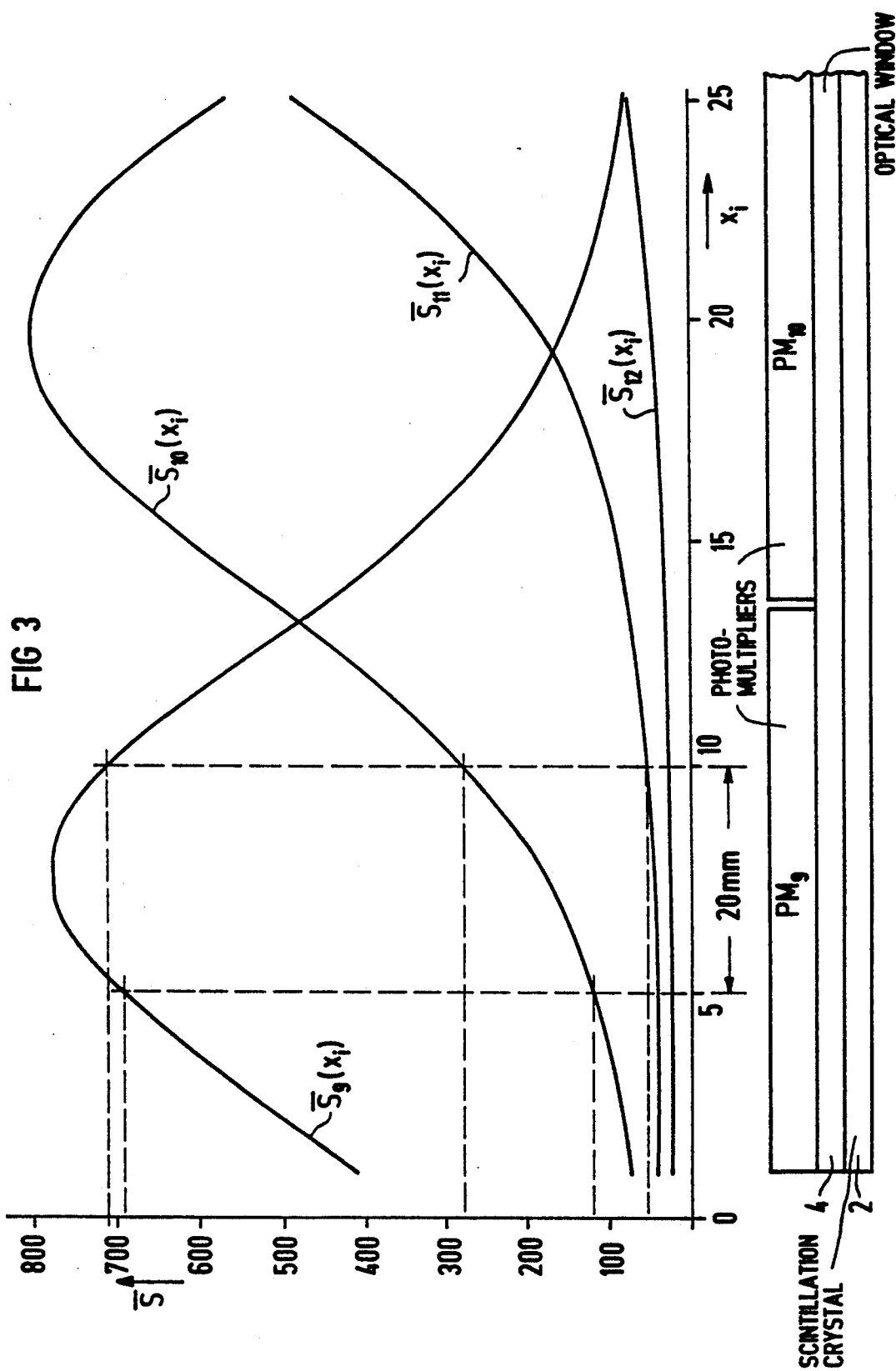
FIG. 3 shows the expected values of the output signals of a series of photomultipliers, in accordance with the principles of the present invention.

As an example for the scanning of the whole crystal surface 2, FIG. 3 shows the expected values that are obtained by scanning along a scanning path 41. The scanning path 41 proceeds over the center points of the photomultipliers $PM_9$ to $PM_{12}$. In the diagram in FIG. 3, scanning points $x_8$ are entered on the abscissa at a spacing of 4 mm from one another. The ordinate designates in arbitrary units the expected value $\bar{S}_e(x_i)$ of the output signals of the individual photomultipliers PM. The expected value of the photomultiplier $PM_9$, is given with $\bar{S}_9(x_i)$. For the scanning point 10 it can be seen, for example, that the expected value $S_9(10)$ of the photomultiplier is somewhat greater than 700, while the expected value $S_{10}(10)$ of the photomultiplier $PM_{10}$ is about 280. The expected values $\bar{S}_{11}(10)$ and $\bar{S}_{12}(10)$ of the photomultipliers $PM_{11}$ and $PM_{12}$ lie under 100 and change only slightly in the region about the scanning point 10. Underneath the abscissa of the diagram, the position of the photomultipliers $PM_9$ and $PM_{10}$ is further represented with respect to the scanning positions $x_i$. It can be seen that the expected value $\bar{S}_e(x_i)$ of the photomultipliers PM is greatest when the scanning place $x_i$ lies in the middle of the corresponding photomultiplier.

Figure 4:
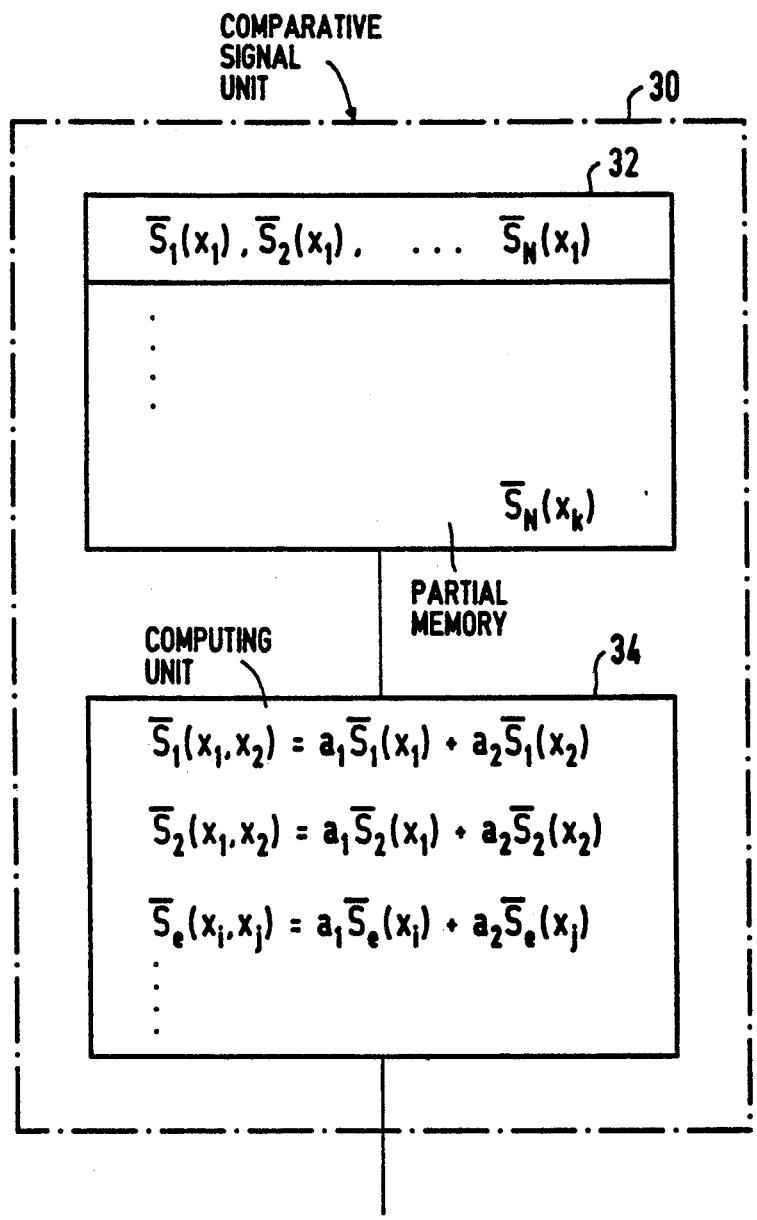
FIG. 4 shows a comparative signal unit for comparative signal sets, in accordance with the principles of the present invention.

The thus determined expected values of individual comparative scintillation events with respective known origins (expressed in coordinates) are entered in the memory 32 as indicated in FIG. 4. The first comparative signal set consists of the expected values of the output signals $\bar{S}_1$ to $\bar{S}_N$ of all the photomultipliers $PM_1$ to $PM_N$, when the comparative scintillation event is generated at the location $x_1$ in the scintillation crystal 2. The second comparative signal set contains the expected values of the output signals $\bar{S}_{10}$ to $\bar{S}_N$, when the comparative scintillation event is generated at the place $x_2$. When the entire surface of the scintillation crystal 2 is scanned in k points, a total of k comparative signal sets are stored in the memory 32, which originate from primary events.

The multiple comparative signal sets for multiple scintillation events can be formed theoretically from the comparative signal sets for individual events that are stored in the memory 32 as follows. For the example of a double event that consists of two primary individual events, reference is made to FIG. 3. The comparative signal set for a double event consists of the sum of the expected values of the individual events generated at the corresponding places. Thus, the expected value of the output signal of the photomultiplier $PM_9$ in the case of a double event at the locations 5 and 10 according to FIG. 3 has a value of about 1400. Not only multiple scintillation events originating from primary events that are to be located, but also multiple scintillation events that are composed, for example, of a primary event and a scatter event whose energy is less than the energy of a primary event. The latter case occurs frequently in clinical practice and with known processes could be registered only under certain border conditions for the generation of a scintigram. Scatter events or, more generally stated, events of different energy are taken into account by the fact that a multiple comparative signal set is a linear combination of several individual comparative signal sets. If, for example, a double event is to be localized, the multiple comparative signal set is generated from two individual comparative signal sets, as represented in FIG. 4. The factors $a_1$ $a_2$ in the case of m events $a_1, \ldots, a_m$ determine the energy of the individual events of which the multiple event under consideration consists.

In principle the locating proceeds such that, for example, in the localization of a double event the likelihood function is maximized not only with respect to the locations $x_i$, $x_j$, but also with respect to the factors $a_1$, $a_2$. In the case of multiple events the number of parameters to be varied is increased correspondingly. The result is a location and an energy determination. In order to decrease the calculating time for the localization, not all conceivable combinations $x_i$, $x_j$ and $a_1$, $a_2$ are used for the calculation of the maximum-likelihood function, but an adaptive process is undertaken by using decreasingly smaller step widths the maximum is approached.

Figure 7:
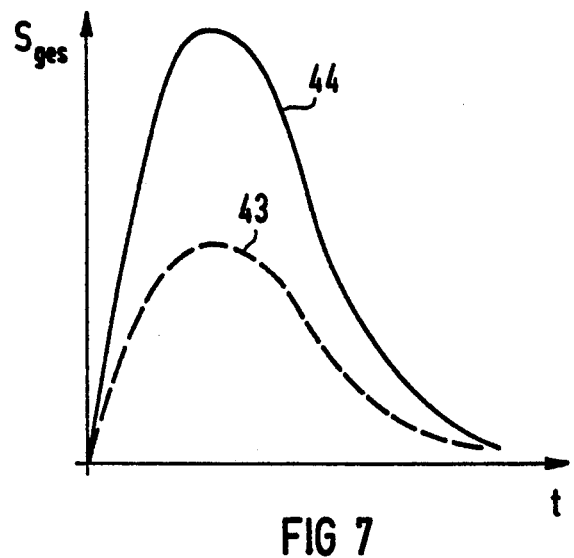
FIG. 7 shows a sum signal of a simultaneous double event for use in the inventive method.
Figure 8:
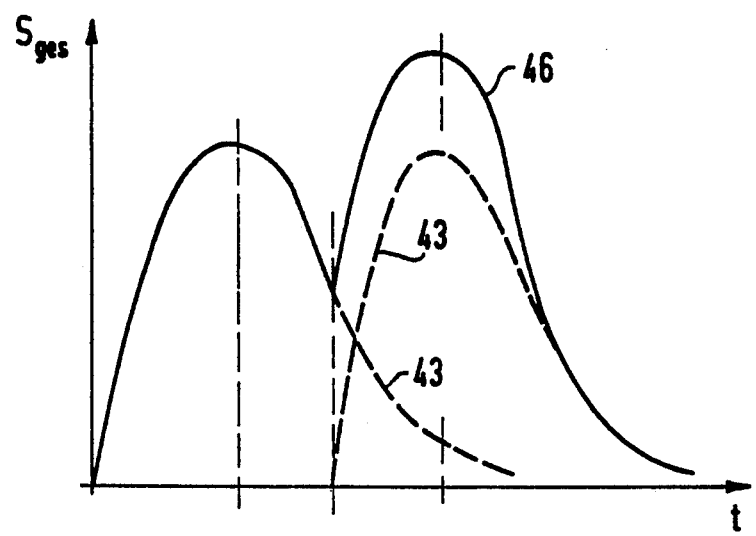
FIG. 8 shows a sum signal of a double event consisting of events arising shortly one after another, for use in the inventive method.

The gamma camera according to FIG. 1 localizes both single and double events. in the usual manner, from the output signals of the photomultipliers PM, the summing unit 16 forms a sum signal $S_{ges}$, the theoretical time curve of which is represented in FIG. 7 and FIG. 8. The amplitude peak value is, in the case of individual (single) events a measure for the energy of the gamma quanta absorbed in the scintillation crystal 2. This peak value is subject to a statistical scattering. In FIG. 7, a curve 43, for example, shows the sum signal of an individual scintillation event and a curve 44 shows the sum signal of two simultaneously occurring individual events or of a double event. Two single events, however, can occur also shortly after one another, therefore only substantially simultaneously, as represented in FIG. 8. The curves 43 show again the sum signal of the individual events. The sum signal of the corresponding double event is represented by the curve 46; it is obtained from an addition of the values of the two curves 43. The double events represented in FIGS. 7 and 8 are rejected in conventional known gamma cameras; at best such cameras there can localize only the first-occurring event in FIG. 8.

The localization proceeds as described in the following. The pulse form analyzer 22 generates a signal when the sum signal $S_{ges}$ exceeds a threshold that lies above the dark noise of the photomultiplier PM, indicating an event is present. The integrators 10 and 28 are opened for a time of about 1 to 2 $\mu s$. If within this integration time further event occurs (arrives), the pulse form analyzer 22 again generates a signal, whereupon the integration time is lengthened correspondingly by about 1 to 2 $\mu s$, and so on. If within the last extension time no event occurs (arrives), the integration is ended and the localization of an m-fold event takes place in correspondence to the m-fold signal of the pulse form analyzer 22 within the integration time. It is noted that m can be one.

If the maximum of the maximum-likelihood function lies below a threshold, then in the located single or multiple event there may be concealed a further event which was not possible to discover by the pulse form analyzer 22 because it has too small a distance from the preceding event. Then the localization of an (m+1)-fold event is initiated. If the localization of the (m+1)-fold event does not lead to a satisfactory result, an attempt is made to localize an (m+2)-fold event, and so on. It is possible in this way for multiple events to be localized, which occur so close together in time that the pulse form analyzer 22 detects only a single event, which would otherwise cause the localization to be falsified. In the case of a double event the localization as single event leads to a location between the two real events and, in particular, to a strikingly low value of the likelihood function. The similarity value formed from the likelihood function then lies under a threshold value, whereupon the pattern-recognition process for double events is started. The subsequent as double event results in substantially correct identification of the locations and energies of the individual (single) events. The repeated start of the pattern-recognition process with comparative signal sets, which is generated by a number raised by one of comparative scintillation events always occurs when the similarity value goes below the threshold value. This process continues until the pattern recognition process with the maximally possible multiple comparative signal set is used for the localization.

Figure 5:
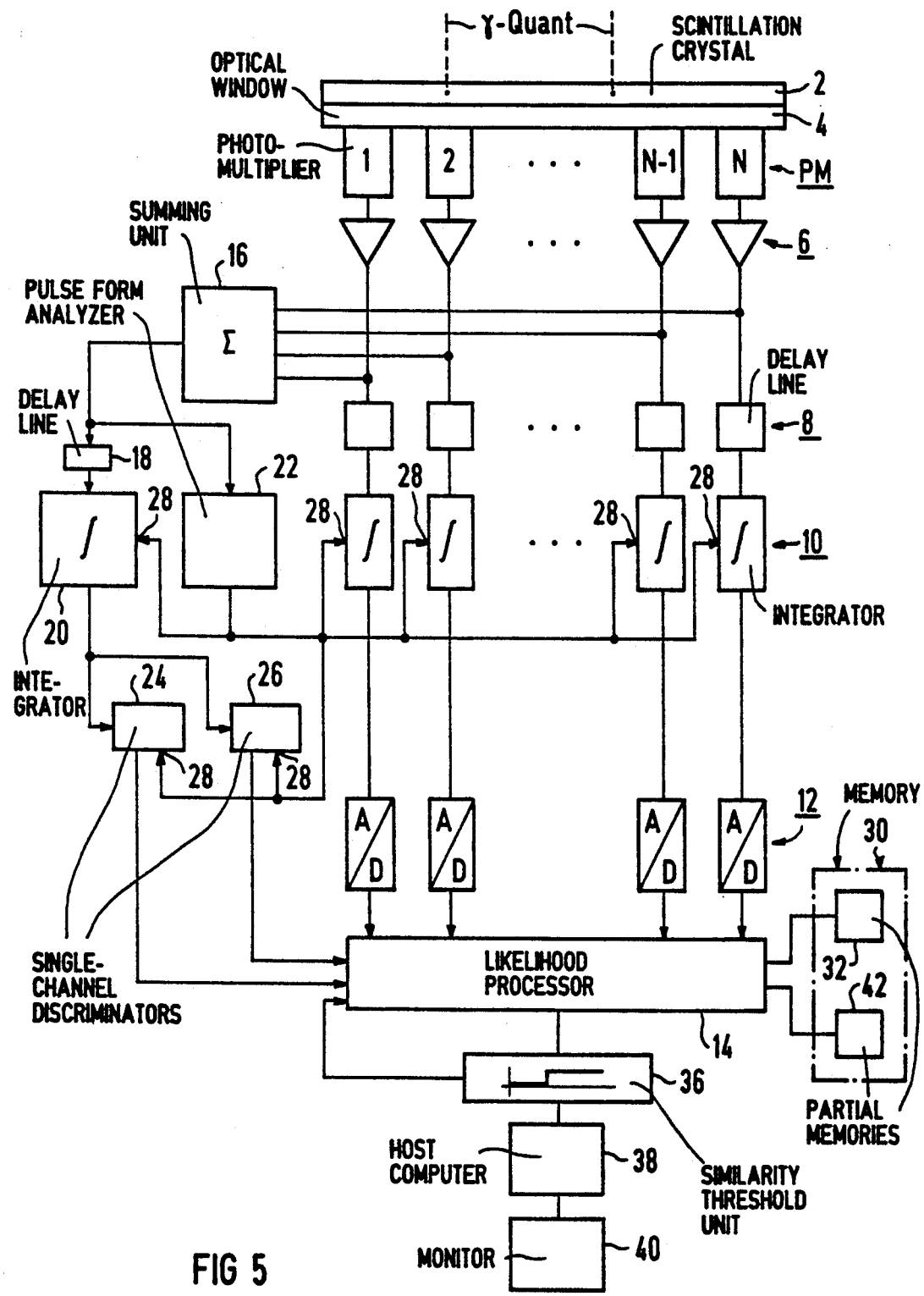
FIG. 5 is a block circuit diagram of a second embodiment of a gamma camera employing a method for the localization of multiple scintillation events, in accordance with the principles of the present invention.
Figure 6:
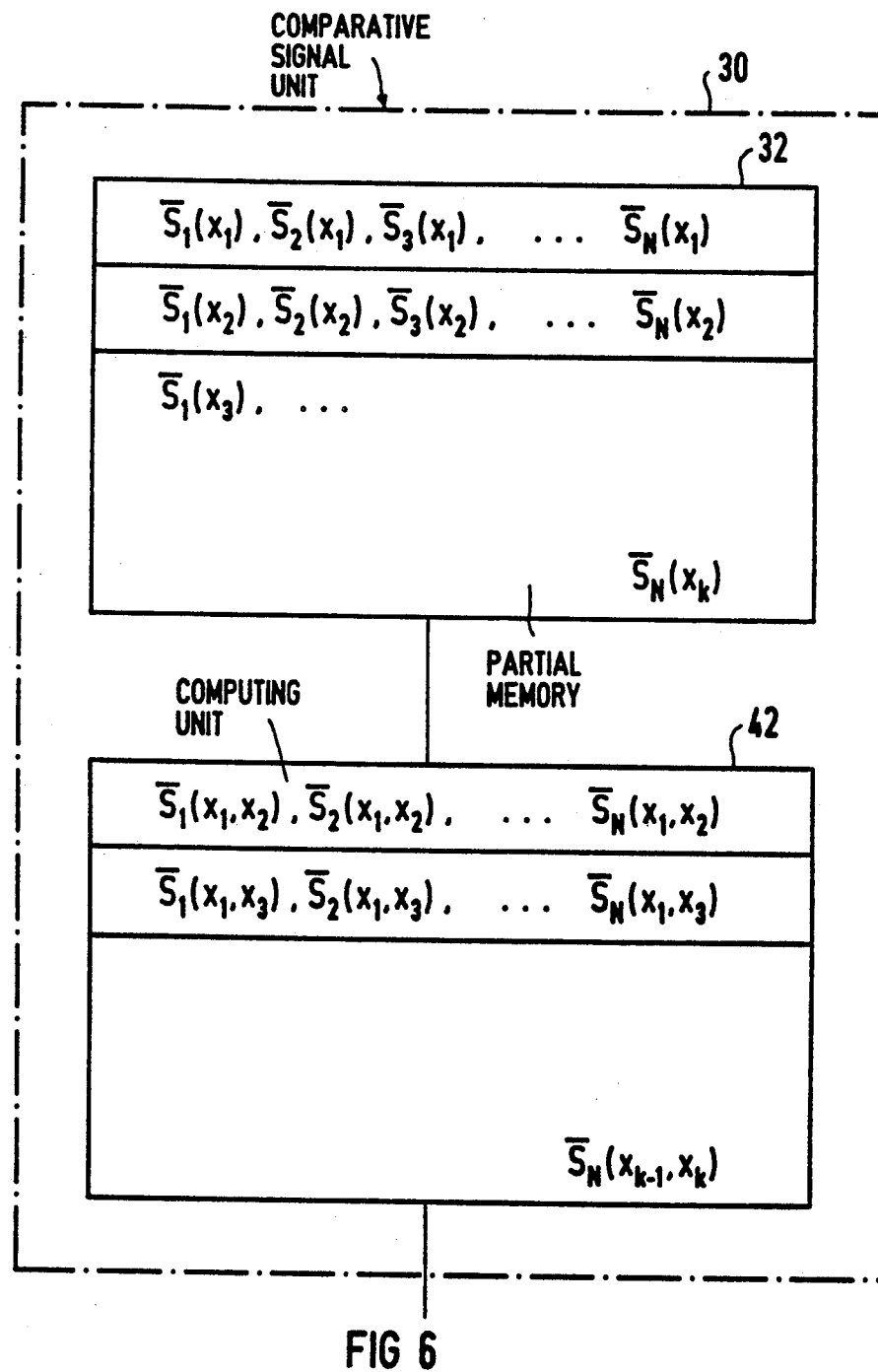
FIG. 6 shows an alternative form of the comparison unit.

In the following, with the aid of FIG. 5, a variant is described, with which double events which are composed of two primary events are localized. The expected values for such double events are, as represented in FIG. 6, given for all possible locations and spacings of the primary single events forming the double events. The number of multiple comparative signal sets stored in the memory 42 for double events is approximately the square of the number of single events stored in the memory 32.

The output of the summing unit 16, in contrast to FIG. 1, is additionally fed via a delay line 18 to an integrator 20. The output of the integrator 20 is connected to two single-channel discriminators 24 and 26. The outputs of the single-channel discriminators 24 and 26 are conducted to the likelihood processor 14. The integrators 10 and 20 as well as the single-channel discriminators 24 and 26 have respective control inputs 28, which are connected with the output of the pulse-form analyzer 22.

Figure 10:
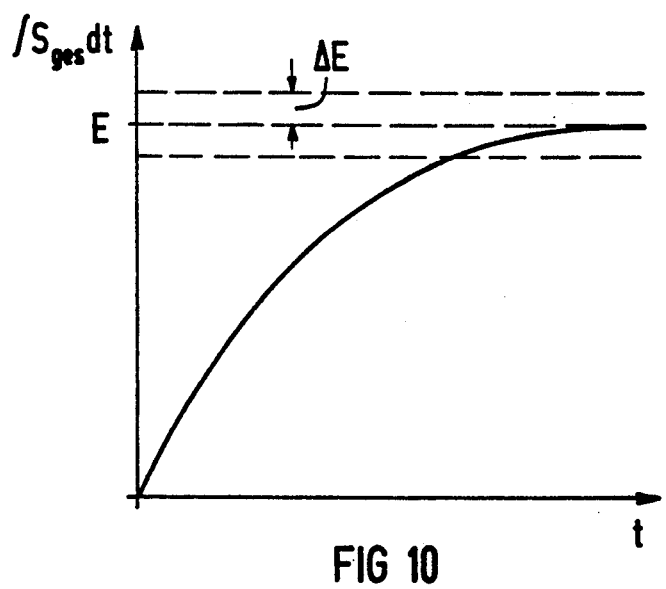
FIG. 10 shows an integrated sum signal for use in the inventive method.
Figure 9:
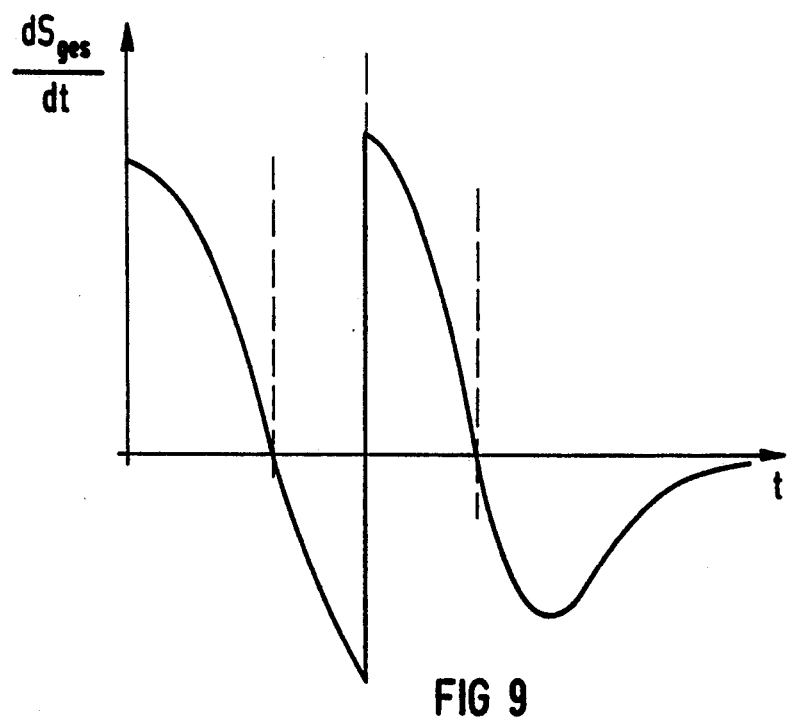
FIG. 9 shows a differentiated double event according to FIG. 8 for use in the inventive method.

In the pulse form analyzer 22 the time curve of this sum signal is sought. The pulse form analyzer 22 detects, for example by differentiation of the sum signal represented in FIG. 8, single events following closely upon one another. The differentiation of such a double event yields the signal curve represented in FIG. 9. If the differentiated sum signal presents this signal curve characteristic for a substantially simultaneous double event, a control signal is generated at the output of the pulse form analyzer 22. If the pulse form analyzer 22 does not deliver any signal because the sum signal does not have the double-peak structure represented in FIG. 8, both the output signals and the sum signal are integrated over a predetermined standard time on the order to 1 to 2 $\mu$s in the integrators 10 and 20. The integrated sum signal is represented in FIG. 10. The maximal value E corresponds to the energy of a primary single or of a primary multiple scintillation event. The integrated sum signals are evaluated, because they exhibit less statistical scatter than the unintegrated sum signals. To improve the precision, the signals to be integrated are conducted through the delay lines 8 and 18, so that the signal processing is not started until the time curve has been ascertained in the pulse form analyzer 22. The integrated sum signal is now fed to the two single-channel discriminators 24 and 26. The first single-channel discriminator 24 examines the sum signal to determine whether it falls into an energy window $E_0 \pm \Delta E$, in which $E_0$ is characteristic for the total energy of primary single quanta. The second single-channel discriminator 26 examines the sum signal to determine whether it falls into an energy window $2E_0 \pm \Delta E$ that is characteristic for a total energy of two primary single-quanta, i.e. is a double event.

If the sum signal does not fall into either of the two windows, then it is a multiple event in which at least one scatter event participates. Such multiple events can be localized with the gamma camera described in FIG. 1. The integrators 10 and 20 can be reset, for example, by a further signal.

If the single-channel discriminator 24 responds, then there is present an initially valid primary single event. Thereupon the analog-digital converter 12 is started and the likelihood processor 14 confirms that a comparison with single comparative signal sets for single events, such as are stored in the memory 32 has taken place. The location of the comparative signal set that presents the greatest similarity (correlation) value to the output signals is assumed as the location place of the single event to be analyzed. This similarity value is further fed to the similarity unit 36. If the result lies over a determined similarity threshold, then the event is accepted as a primary single event and fed to the computer 38. If the similarity value lies beneath the threshold, then a localization is started correspondingly, as is described in connection with the FIG. 1. An event resulting in a similarity value beneath the threshold may be a, for example, double event that only accidentally lies in the energy window, for example two simultaneous scattered events, or an event of an altogether different physical nature.

If, however, the single-channel discriminator 26 responds, then there is present an initially valid double event. As previously, the analog-digital converters 12 are started, but the likelihood processor 14 is now informed that a comparison has taken place with comparative signal sets for double events such as are stored either in the memory 42, or have been calculated according to FIG. 4 from the comparative signal sets for individual (single) events in the memory 32. The factors $a_1$ and $a_2$ are, however, in this embodiment set on "one" because at first no scatter events are to be localized. The location ($x_i$, $x_j$) of the comparative signal set that presents the greatest similarity value to the output signals is accepted as the location of the double event to be analyzed, which consists of two single events at the location $x_i$ or at the location $x_j$. Similarly, as in the analysis of single events, a similarity threshold can be used additionally in order to suppress events of other physical nature, which only accidentally fall into the energy window around $2E_0$ or to start a localization such as is described in connection with FIG. 1.

If now it is ascertained in the pulse form analyzer 22 that the form of the sum signal deviates from that for single events or simultaneous multiple events and, for example, presents the double-peak structure represented in FIG. 8, then the event is in all probability a double event consisting of two single events in short time spacing. If such an indication for double events is found, then the pulse form analyzer 22 causes the integrators 10 and 20 to integrate over a lengthened period of time. The end value E of the integrated sum signal is independent of the time spacing of the single events forming the double event, provided that the integration time is so extended that integration is performed substantially completely on both events. Alternatively, two integrators per signal channel can be used with different, but fixed integration times, between which it is possible to switch over according to the result of the pulse form analyzer 22. If a double peak structure has been determined in the sum signal, then the second single-channel discriminator 26 ascertains whether the signal height of the integrated sum signal is in a window around the double value of a single event $2E_0$. If this is not the case, then the pattern recognition process is started, as described in connection with FIG. 1. If, however, the second single-channel discriminator 26 responds, then there is present an initially valid event in the energy range of a primary double event. Thereupon the analog-digital conversion of the integrated output signals is again started and the likelihood processor 14 is informed that an analysis of primary double events has taken place, the comparative signal sets of which are stored in the second partial memory 42 or, as explained in connection with FIG. 4, are in each case currently calculated, in which process the factors are set at "one" and are not varied. The double result thus analyzed can be fed directly to the host computer 38. If the certainty of the recognition of double patterns is to be improved, the similarity value of the double event found in the likelihood processor 14 is sampled as to whether it lies above a similarity threshold and, if need be, the pattern recognition process according to FIG. 1 is started.

It is evident that the two localization process embodiments described in connection with FIG. 1 and FIG. 5 can be advantageously combined. The control, described in connection with FIG. 5, of the pattern recognition process over energy windows saves computing time. It does not in every case need to be varied over the factors of the linear combinations of single comparative signal sets. If the multiple events consist only of primary events, then a variation over the event type suffices.

Figure 11:
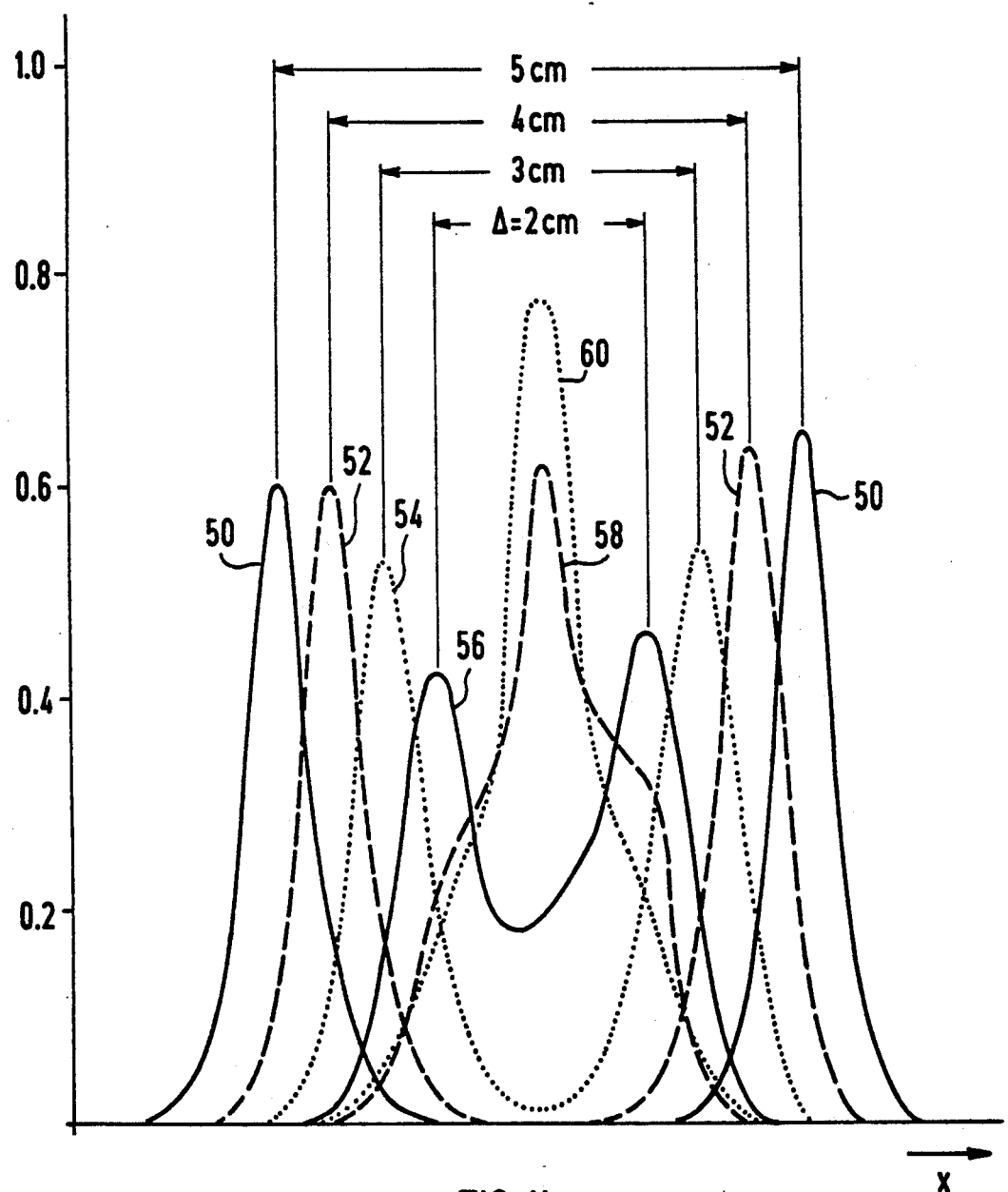
FIG. 11 shows point image functions of double events as a function of the spacing of the scintillation events.

In FIG. 11 there is represented the point-image function of double primary events as a function of the spacing of the double events. The abscissa designates the location of the events and the ordinate designates the number of quanta counted determined over an average value formation. The curves 50 show the point-image function of a gamma camera according to FIG. 1 of two simultaneously or substantially simultaneously occurring single events at spacing of 5 cm. The curves 52, 54 and 56 respectively show the point-image function of double events with a spacing of 4 cm, 3 and 2 cm. The spacing of the double events corresponding to the curves 58 and 60 is less than 2 cm. It can be seen that double events that have a spacing of 4 cm and 5 cm can be completely resolved into single events with the gamma camera operating according to the method described herein. Therewith the counting rate is clearly increased with respect to a conventional gamma camera. Also double events that have a spacing of 2 cm and 3 cm to one another can still be conditionally separated. It is only below 2 cm that the double events can no longer be resolved into their single events, and thus for those events no image-related information can be obtained.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for localizing multiple scintillation events in a gamma camera having a plurality of photomultipliers each of which generates an actual output signal, in response to scintillation events, upon the occurrence of a release signal, said method including a pattern recognition process comprising the steps of:
    generating a plurality of different comparative signal sets, each signal set consisting of expected signal values which said photomultipliers would generate in the presence of scintillation events originating at known locations;
    comparing the actual output signals of said photomultipliers with at least some of said comparative signal sets;
    identifying one of said comparative signal sets, based on the comparison, having the greatest similarity to said actual output signals; and
    registering the locations of the scintillation events in said one of said comparative signal sets as the locations of the scintillation events causing said actual output signals of said photomultipliers.

2. A method as claimed in claim 1 wherein the step of generating a plurality of comparative signal sets is further defined by the steps of:
    generating and storing a comparative scintillation event signal caused by a single scintillation event originating at a known location; and
    combining different combinations of said comparative scintillation event signals in a computing unit to form said plurality of comparative signal sets.

3. A method as claimed in claim 1 wherein the step of generating a plurality of comparative signal sets is further defined by the steps of:
    generating a plurality of individual comparative signal sets each including pattern recognition process factors; and
    linearly combining a plurality of said individual comparative signal sets while varying the respective pattern recognition process factors thereof in the linear combination to form each of said comparative signal sets in said plurality of comparative signal sets.

4. A method as claimed in claim 1 comprising the additional steps of:
    defining an energy window having boundaries at the expected energy value of a plurality of primary scintillation events; and
    generating said release signal when the sum of the energy of all of said actual output signals is within said energy window.

5. A method as claimed in claim 1 comprising the additional step of:
    integrating said actual output signals before subjecting said actual output signals to said pattern recognition process.

6. A method as claimed in claim 5 comprising the additional steps of:
    determining whether the scintillation events causing said actual output signals occur simultaneously or occur briefly overlapping one another in time; and
    varying the time over which said actual output signals are integrated dependent on whether said scintillation events occur simultaneously or briefly overlap one another in time.

7. A method as claimed in claim 6 comprising the additional step of:
    setting the number of comparative signal sets in said plurality of comparative signal sets dependent on the number of said scintillation events which brief overlap one another in time.

8. A method as claimed in claim 5 comprising the additional step of:
    converting the integrated actual output signals into digital integrated actual output signals before subjecting them to said pattern recognition process.

9. A method as claimed in claim 1 comprising the additional step of:
    storing said plurality of comparative signal sets in a memory.

10. A method as claimed in claim 1 wherein the step of generating a plurality of comparative signal sets is further defined by generating a plurality of comparative signal sets each of which consists of expected signal values which said photomultiplier would generate in the presence of exclusively primary scintillation events originating at known locations.

11. A method as claimed in claim 1 comprising the additional steps of:
    defining an energy window having boundaries at the expected energy value of a plurality of scintillation events; and
    generating said release signal when the sum of the energy of all of said actual output signals is within said energy window.

12. A method as claimed in claim 1 wherein the step of identifying said one of said comparative signal sets includes the step of generating a similarity value defining the similarity of said actual output signals to said one of said comparative signal sets, and said method comprising the additional steps of:
  comparing said similarity value to a threshold value; and
  registering said locations only if said similarity value exceeds said threshold value.

13. A method as claimed in claim 12 comprising the additional steps of:
  if said similarity value is below said threshold value, increasing by one the plurality of said comparative signal sets which are generated; and
  repeating said pattern recognition process.

14. A method as claimed in claim 1 wherein the step of generating a plurality of comparative signal sets is further defined by generating a first plurality of said comparative signal sets for single scintillation events and generating a second plurality of said comparative signal sets for double scintillation events, wherein the step of comparing the actual output signals of said photomultipliers with at least some of said comparative signal sets is further defined by initially comparing said actual output signals of said photomultipliers with at least some of said comparative signal sets in said first plurality of comparative signal sets, wherein the step of identifying one of said comparative signal sets includes the step of generating a similarity signal defining the similarity of said actual output signals to one of said comparative signal sets in said first plurality of comparative signal sets, and said pattern recognition process including the additional steps of:
  comparing said similarity value to a threshold value;
  if said similarity value exceeds said threshold value, registering the location of the single scintillation events in said one of said comparative signal sets in said first plurality of comparative signal sets as the locations of the scintillation events causing said actual output signals of said photomultiplier; and
  if said similarity value is beneath said threshold value, repeating said pattern recognition process using said second plurality of comparative signal sets.

* * * * *